Dec. 28, 1943.　　M. S. KONIGSBERG ET AL　　2,337,722
PHOTOFLUOROGRAPHIC APPARATUS
Filed Nov. 22, 1941　　4 Sheets-Sheet 1
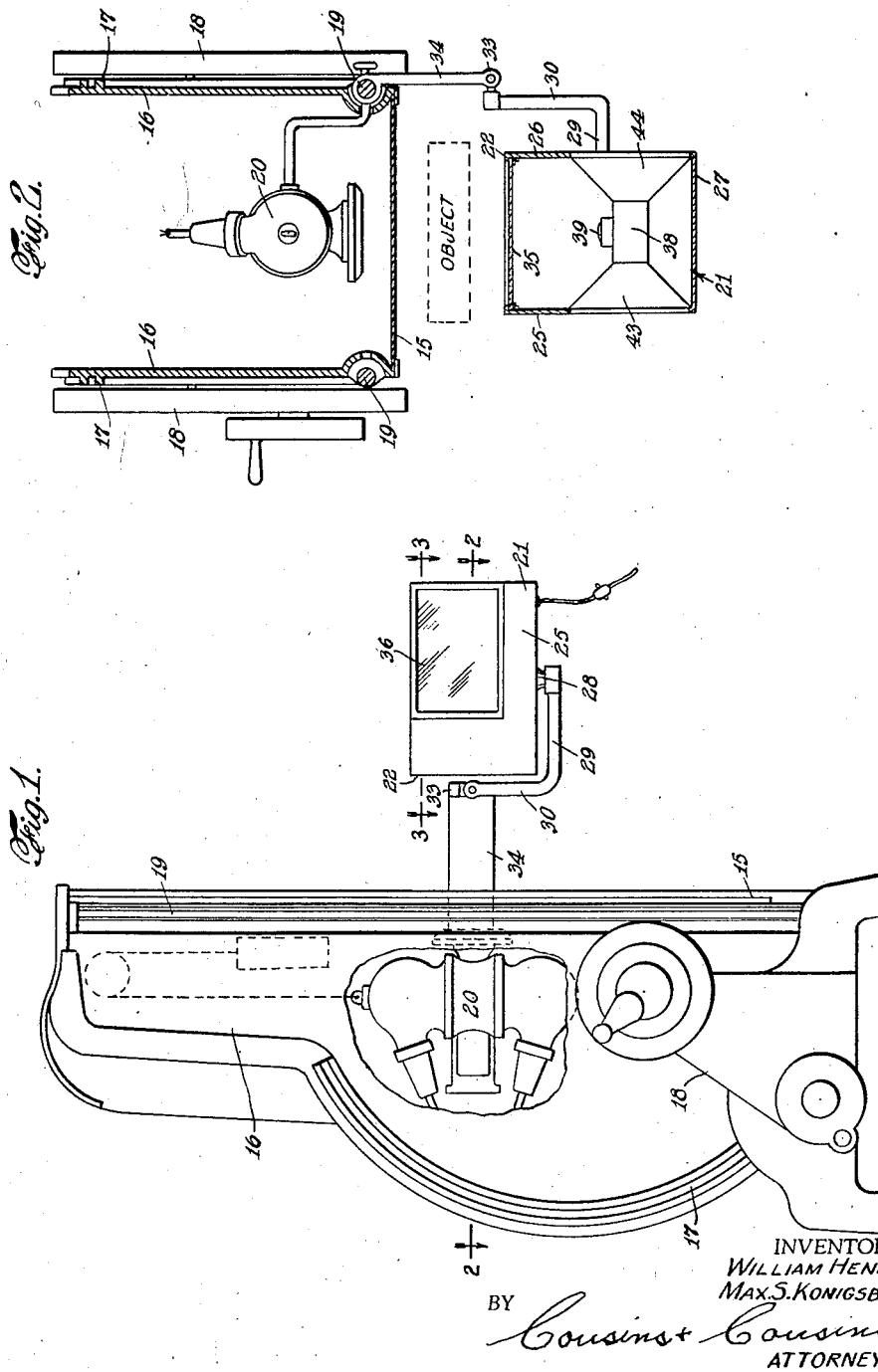
INVENTORS
WILLIAM HENRY
MAX S. KONIGSBERG
BY Cousins + Cousins
ATTORNEYS.

Dec. 28, 1943. M. S. KONIGSBERG ET AL 2,337,722
PHOTOFLUOROGRAPHIC APPARATUS
Filed Nov. 22, 1941 4 Sheets-Sheet 2

INVENTORS.
WILLIAM HENRY
MAX S. KONIGSBERG
BY Cousins & Cousins
ATTORNEYS.

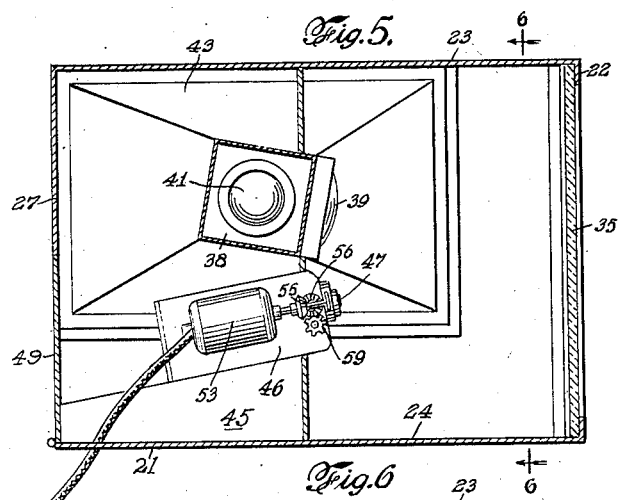

Dec. 28, 1943.  M. S. KONIGSBERG ET AL  2,337,722
PHOTOFLUOROGRAPHIC APPARATUS
Filed Nov. 22, 1941  4 Sheets-Sheet 4
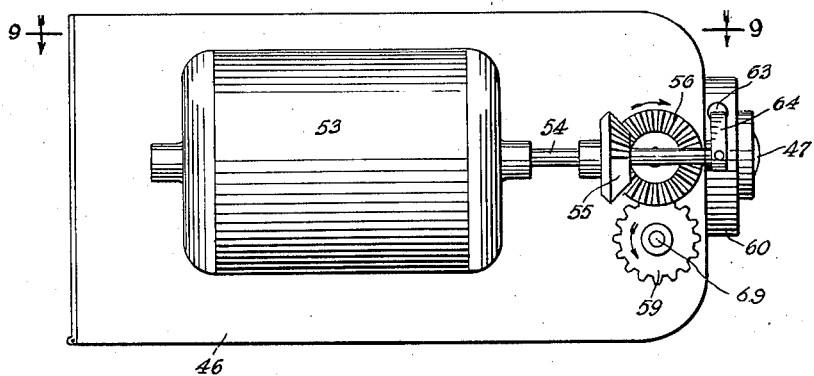
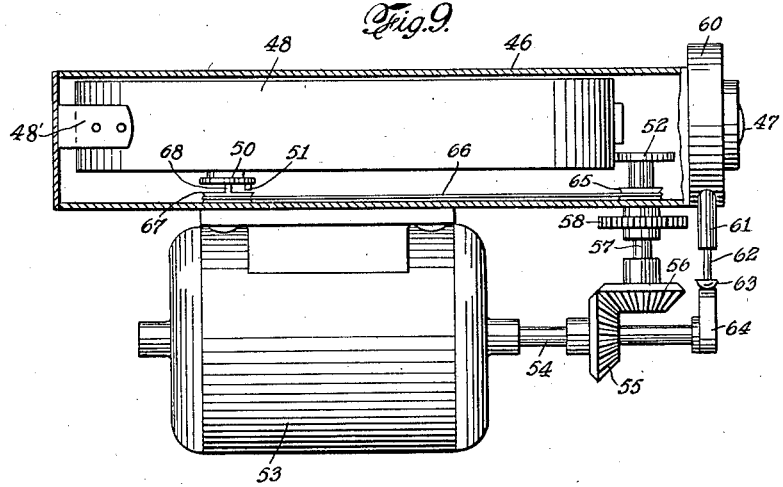
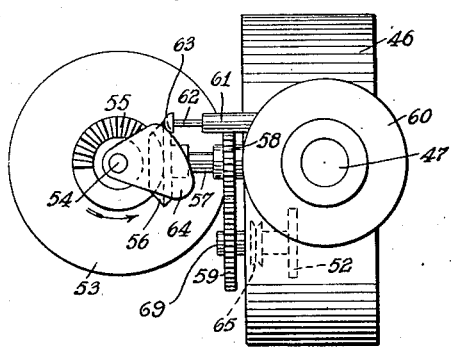
INVENTORS.
WILLIAM HENRY
MAX S. KONIGSBERG
BY Cousins + Cousins
ATTORNEYS.

Patented Dec. 28, 1943

2,337,722

UNITED STATES PATENT OFFICE 2,337,722

PHOTOFLUOROGRAPHIC APPARATUS

Max S. Konigsberg, New York, and William Henry, St. George, Staten Island, N. Y.

Application November 22, 1941, Serial No. 420,050

4 Claims. (Cl. 250—65)

This invention relates to photofluorography in which X-rays, that is electromagnetic waves of short wave length, detected photographically by fluorescence, are used in penetrating matter opaque to light, such, for instance, as obscure, interior regions of the body.

The invention disclosed herein may be used by the United States Government without payment of royalty to the applicants or either of them.

Roentgen ray delineations are known to have been made of various subjects, at irregular intervals, on diverse sizes of films, but from which it is not possible to make a complete and satisfactory analysis and study of a moving object, organ or group of organs. For example, studies of the action of the human heart are done with a fluoroscope and an X-ray picture shows the heart at one definite stage in its intermittent movements; such fluoroscopic findings are not permanently recorded at the present time and no sound record made.

With this invention, multiple, regular interval pictures can later be projected on a screen and carefully studied in the same manner that one individual X-ray picture can be studied with the aid of a shadow box.

A very important feature of the invention is that the camera faces the fluoroscopic screen, thereby reducing the hazard of aberration to a minimum. A wide angle lens is used so that the relatively weak light emitted through the screen may be intensified upon the film.

With proper adjustment of the fluoroscope, by regard to milliamperage and kilovoltage, and with the aid of a wide aperture lens, with a small f value and speed film, rapid taking of pictures is made possible.

Clouding of film, due to the action of X-rays, is totally eliminated by means of a lead glass plate, covering the screen, which filters out the X-rays.

The operator is out of the direct path of the X-rays generated by the herein described method of having the operator positioned at the side of and remote from the fluoroscopic screen instead of directly in front of it. The operator can visualize the screen by means of this invention with the aid of lenses and mirrors or prisms, which are so arranged as to throw the images of the fluoroscopic screen at a right or other desirable angle onto an X-ray proof screen.

The chances of X-ray burns, which often occur as the result of fluoroscopy, rather than of radiography, are reduced to a minimum. At the same time, the operator of the fluoroscope will have convenient and comfortable access to the mechanisms necessary for the correct and proper control and operation of the fluoroscope and camera.

During this fluoroscopy, photographs may be taken at the same time as observations are made. The control switch for the fluoroscope and photofluorographic device are separate so that the operator has the choice of ordinary fluoroscopy, fluoro-photography, or both simultaneously.

This device neither adds or subtracts from the fluoroscopic screen generally used, since the operator views the image through a large screen and not a small restricted eye-piece.

By means of this invention, new research fields are opened because of the motion picture factor.

Thus the exact method of the emptying of a normal, as well as an abnormal, stomach can be studied; a radio-opaque substance may be introduced into the gall bladder and the question of how and when of regurgitation, into the stomach from the duodenum can be worked upon. There are other organs such as the kidneys, liver, and pancreas, whose methods of action, secretion and excretion can be followed through by the use of radio-opaque substances photofluorographed at rapid and regular intervals.

For medical teaching purposes photofluorographs would be an important aid from the point of view of explaining physiological, as well as pathological, processes which previously had to be explained by descriptions and diagrams.

It is also within the province of the invention to arrange means for recording sounds, coincidently with taking pictures, whereby the action of the heart, lungs and other organs from which sound is emitted, may be recorded for study, clearly determining abnormal conditions, such sounds being intensified by well-known means in the manner of an electrostethoscope producing full audition.

It is therefore an object of this invention to provide means for making a complete and permanent X-ray photographic record of an object in motion, on a length of film suited to the occasion, or a single exposure, as may be desired, and of any size.

A further feature is the provision of means whereby the operator is safely shielded from direct exposure to the rays passing through the object, the operator however having a clear uninterrupted view of a screen on which the exposed subject is shown and able to start, stop and control the taking of the photographic record.

Another purpose is to produce an apparatus in which the camera directly faces the fluoroscopic screen, thereby removing the hazard of aberrations to a minimum, while the operator can visualize the screen, at a right or other angle, by means of a mirror or prism, the picture being shown upon an X-ray proof screen in full view.

These and other meritorious objects, such as versatility of use, inexpensive construction and ease of operation, are accomplished by the novel and practical construction, combination and arrangement of parts hereinafter described and illustrated in the accompanying drawings, constituting a component of this disclosure, and in which:

Figure 1 is a side elevational view of a conventional type of fluorescent apparatus, partially broken away to show the X-ray tube, and having attached an embodiment of the invention.

Figure 2 is a transverse sectional view looking on line 2—2 of Figure 1.

Figure 5 is a transverse sectional view taken on line 5—5 of Figure 4, partially broken away to show the construction.

Figure 6 is a vertical sectional view taken on line 6—6 of Figure 5.

Figure 7 is a perspective view illustrating one application of the invention.

Figure 8 is a side elevational view of the film and shutter actuating means.

Figure 9 is a partial top plan, partial sectional view of the same.

Figure 10 is a front end elevational view thereof.

Figure 3:
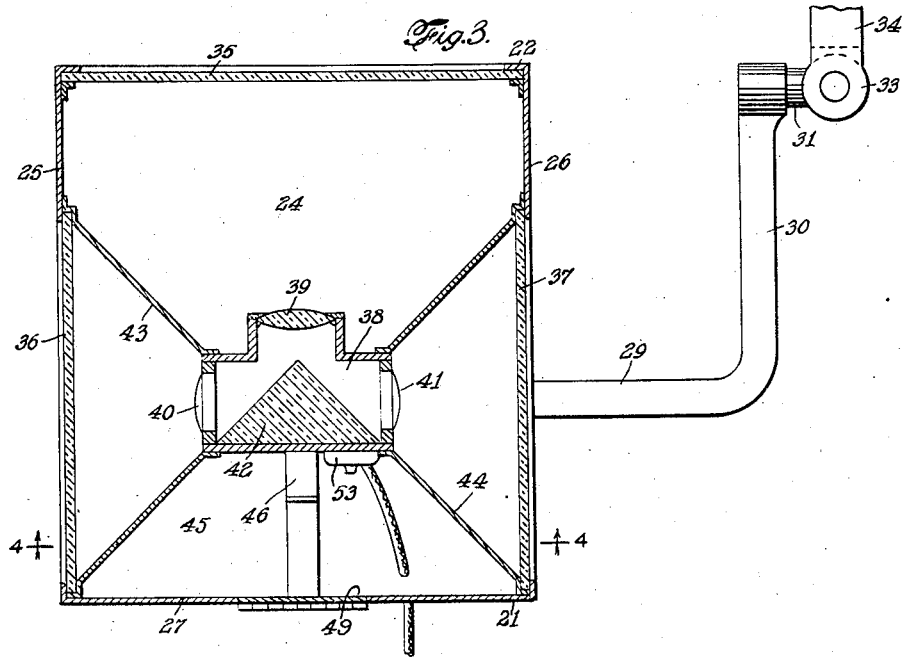
Figure 3 is a similar sectional view looking on line 3—3 of Figure 1, drawn to an enlarged scale.
Figure 4:
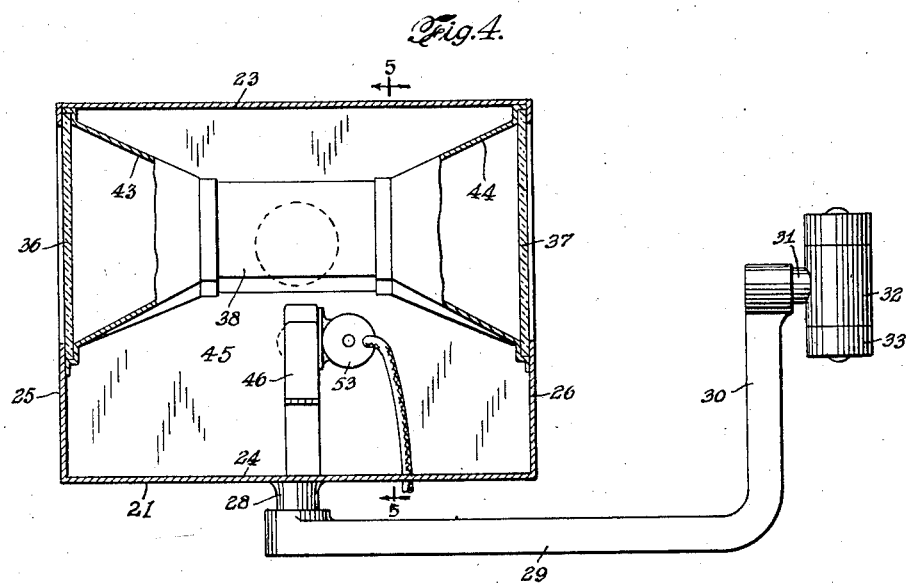
Figure 4 is a vertical sectional view looking on line 4—4 of Figure 3.

Referring in greater detail to the drawings, the numeral 15 designates in general the front element of an inclinable, counter-weighted fluoroscopic apparatus mounted on side frames 16 having curved bases 17 engaged in base standards 18 containing guideways, and means for inclining the apparatus, which is provided at its front side edges with longitudinal rails 19 on which an X-ray generating tube 20 of high power is adjustably mounted, together with a light-tight housing 21 capable of being raised, lowered and tilted in exact synchronism with the light source.

It will be understood that the X-ray tube 20 is of the type usually employed in fluoroscopic and fluorographic work, in making diagnostic surveys of the character for which the device is specifically adapted, this structure being conventional, and given only so that a clear understanding of the invention may be had.

The housing 21 consists of a rectangular boxlike structure having an opening in its front wall 22, a ceiling 23 and flooring 24, together with end walls 25 and 26 and a rear wall 27.

Reaching centrally downward from the flooring 24 is a lug 28, pivoted in a laterally extending arm 29 terminating in an angularly turned portion 30 in which is set a pivot 31, connecting with a swivel 32 mounted in a link 33 connected with an arm 34, slidable along one of the rails 19 and so arranged that the housing moves in exact synchronism with the X-ray tube 20.

The several joints, however, enable an operator to adjust the focus of the lens, within the housing 21, as may be necessary, and it will be understood that means are provided for retaining the several joints in adjustment.

Set in the front wall 22 of the housing is a fluoroscopic plate 35, while in the side walls 25 and 26 are disposed X-ray proof screen plates 36 and 37 of translucent nature.

Midway between the sides of the housing 21 is a T shaped chamber 38, its central opening being fitted with a wide angle lens 39, while the end openings are provided with lens 40 and 41, respectively left and right. It is to be noted that the chamber 38 is inclined downwardly at its inner end so that the lens 39, carried therein, is directed to a point on the plate 35 which is central of the path of rays from the X-ray tube 20.

Fixed vertically in the chamber 38 is a triangular prism 42 arranged with its angular face directed toward the center of the lens 39, the disposition being such as to disperse the X-rays equally outward, through the lens 40 and 41, upon the screen plates 36 and 37.

The chamber is further provided with truncated conical guards 43 and 44 extending from the lenses 40 and 41 and having flanged bases, acting to retain the screens 36 and 37 in their proper position.

From the foregoing it will be apparent that an object disposed between the fluoroscopic plate 35, and X-ray tube 20, will be mirrowed upon the prism 42 and shown equally on the screens 36 and 37, thus giving an observer a true representation of the object under observation.

In order to obtain photographic reproductions of the object, it is preferred to enclose the chamber 38 and its appurtenances within a light-tight casing having in its rear central portion an upwardly inclined compartment 45, into which may be entered a casing 46 disposed at an opposite angle to that of the observation elements, the casing having at its inner end a lens 47 and being suited to contain a film magazine 48 of the usual type of construction.

The casing 46 may be entered into the housing 21 by opening a hinged door 49 in its rear wall 27; the magazine 48 has a spring 48' to hold it steadily in position against a fixed stop in the housing, and is provided with a friction film take-up means 50, including a pin 51, while an opening in its front end is suited to receive a sprocket wheel 52 adapted to engage with the usual feed perforations in the margin of a standard type of moving picture film.

Attached to the outer side of the casing 46, within the housing, is an induction motor 53 suited to operate at a low rate of speed, preferably not to exceed 120 revolutios per minute; the motor shaft 54 has fixed upon it a mutilated gear 55, meshing with a mating gear 56, secured upon a transverse shaft 57, on which is a spur gear 58, driving a similar gear 59, fast upon a spindle 60 directly below the shaft 54, and having fixed upon it the sprocket wheel 52.

Adjacent the lens 47 is a shutter case 60 having a lateral projection 61 in which is slidably mounted a shutter stem 62, normally pressed outwardly by a spring (not shown), and provided with a rounded knob 63.

Fixed on the extreme outer end of the motor shaft 54 is a cam 64 adapted to operate in the manner of a tappet, against the knob 63, forcing it inwardly in timed relation to the movement of the cine film, the cam being of such shape as to avoid loss of time during the movement of one film frame to the next adjacent.

Also set on the spindle 69 is a pulley 65, over which is trained a belt 66, driving a similar pulley 67 having on its face a raised bar 68 adapted to engage with the take-up pin 51, thus maintaining the film suitably tensioned.

Obviously the action of the motor and of the X-ray tube is under the instant and immediate control of an operator, who is thus enabled to merely view and observe what is taking place in the interior of the subject matter of the investigation or, if desired, to make a permanent record of the same simultaneously with its observation.

It is also within the province of the invention to develop means for recording sounds that may emanate from such interiors, coincidentally with the observation of their movement.

It is further apparent that if desired, one of the screen plates, as 37, may be entirely removed and light emanating from the X-ray tube, passing through the subject, thence to be delivered outwardly by reason of the prism, may be shown upon a cinema screen X disposed at a considerable distance from the operator, so that several persons may simultaneously observe whatever may be occurring within the object under investigation.

Although the foregoing is generally descriptive of the best known adaptation of the apparatus, it is not to be considered as restrictive, as many changes and modifications may be made within the scope of the appended claims.

Having thus described the invention and set forth the manner of its construction and application, what is claimed as new and sought to secure by Letters Patent, is:

1. An instrumentality for viewing and photographically recording the movements of concealed active elements, comprising in combination with a fluorescent screen, and an X-ray apparatus between which said active elements are positioned for exposure, a housing having a lens directed at said screen, a prism in said housing to divert the X-rays laterally through the side walls of said housing, a camera in said housing containing a film supply, motor driven sprockets to advance the film in the camera at timed intervals, a shutter, and means actuated by the motor for closing said shutter during the advance movement of the film.

2. In apparatus for the examination of internal anatomic organisms, the combination with an X-ray tube and an enclosed fluorescent screen, a chamber disposed at an angle to rays from said tube and having a lens directed towards said tube, means in said chamber to visualize the effect of said rays, a camera in said casing disposed at an opposite angle to said chamber, a film magazine combined with said camera, a motor to actuate the film in said magazine, a shutter operated by said motor, and means operated by said motor for tensioning the film in said magazine.

3. In apparatus for photographically recording anatomic organisms while in motion, the combination with an X-tray tube and a fluorescent screen, a casing for said screen, a camera in said casing, said camera including a film having a magazine and a shuttter, an induction motor, means actuated by said motor to periodically advance the film, means combined therewith to operate said shutter and to tension said film, and remote controls for said motor.

4. In apparatus for photographically recording anatomic organisms while in motion, the combination with an X-ray tube and a fluorescent screen, a casing for said screen, a camera in said casing, said camera including a film having a magazine and a shutter, an induction motor, means actuated by said motor to periodically advance the film, a cam driven by said motor to control said shutter conjunctively with advance of said film, a friction drive actuated by said motor to tension said film, and a control means for said motor.

MAX S. KONIGSBERG.
WILLIAM HENRY.